3,368,869
AMMONIA SYNTHESIS
Lee S. Gaumer, Jr., Allentown, Pa., assignor to Air Products and Chemicals, Inc., Philadelphia, Pa., a corporation of Delaware
Filed Sept. 10, 1964, Ser. No. 395,405
5 Claims. (Cl. 23—199)

ABSTRACT OF THE DISCLOSURE

In an ammonia synthesis loop, a turbine-driven compressor is provided wherein fuel gas is expanded in the turbine and synthesis gas is precompressed in the compressor. The expanded low-temperature fuel gas is further utilized by heat exchange with the compressed synthesis gas to cool the latter and the portion of the recycle gas from the last ammonia separator which is normally discharged and used as fuel gas is also utilized to cool the synthesis gas and drive the turbine.

---

Figure 1:
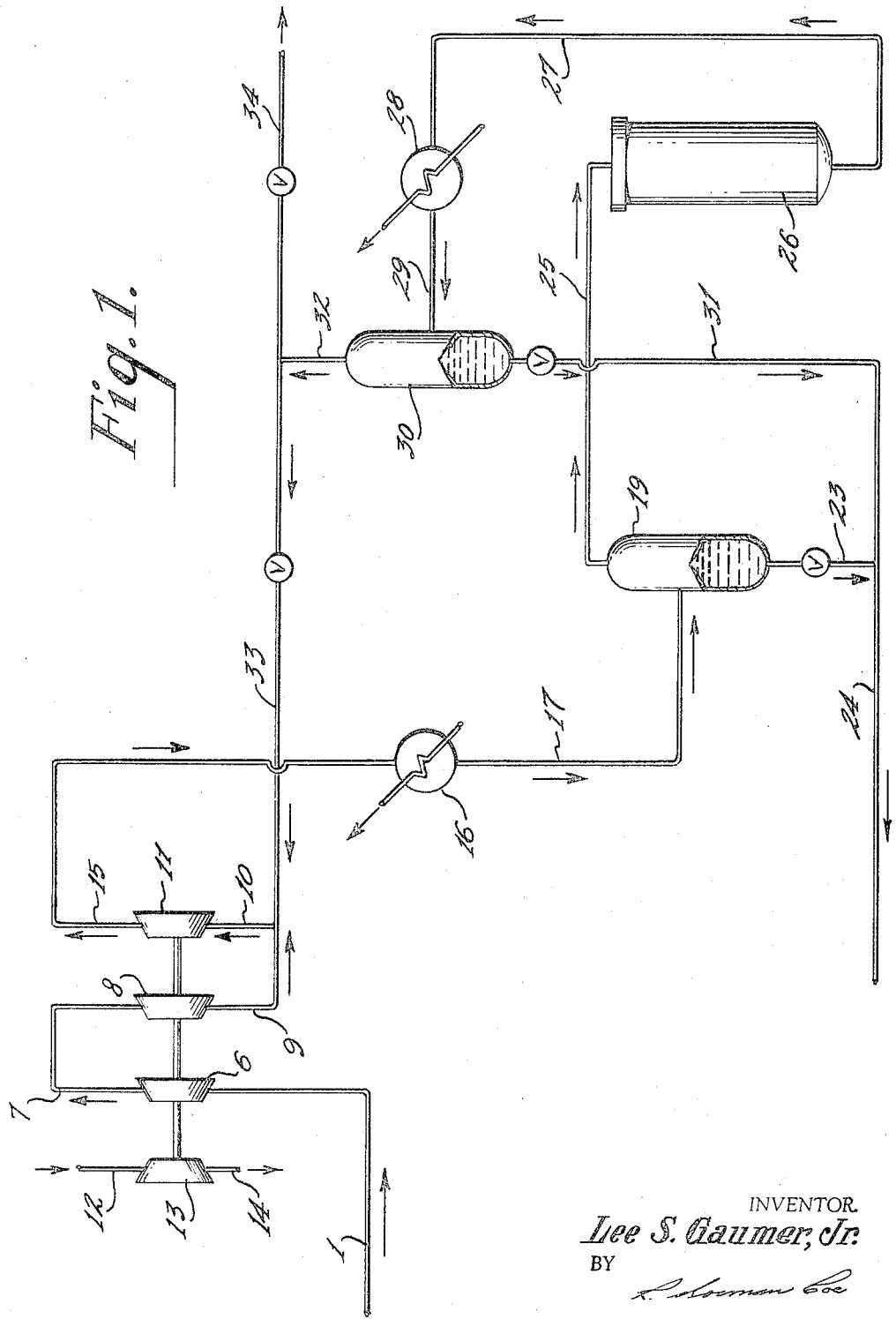

This invention relates to a process for the precompression of synthesis gas supplied to an ammonia plant synthesis loop.

Many variations of the original Haber process for the synthesis of ammonia are now used in commercial practice. While all commercial operations involve the fundamental steps of (1) producing a gas mixture containing hydrogen and nitrogen in the proportion of 3 parts of hydrogen to 1 part of nitrogen, (2) purifying this mixture and (3) synthesis of ammonia under pressure in the presence of a suitable catalyst, variations exist in the different sources for obtaining hydrogen and nitrogen, the methods of gas purification, the catalyst used, the conditions of temperature and pressure for ammonia synthesis and the methods of product recovery.

It has now been discovered that a low pressure synthesis loop for the production of ammonia may be modified through the precompression of synthesis gas to effect substantial energy savings in the overall system or provide potential for increased ammonia production.

The invention is clarified by reference to the following description read in connection with the drawings which diagrammatically illustrate the general layout of an ammonia plant synthesis loop. With the exception of certain valves, apparatus not considered necessary to an understanding of the invention has been omitted in each of the illustrations. Since the function and operation of said valves are well known, they have not been numerically identified in the drawings.

In a modern plant for the low pressure synthesis of ammonia, as shown in FIGURE 1, ammonia synthesis gas having a ratio of 3 mols of hydrogen for each mol of nitrogen is introduced at 100° F. and 366 p.s.i.g. to the synthesis loop along line 1; the synthesis gas having been produced in a conventional steam reformer (not shown). This gas passes through compressor 6 and along line 7 to compressor 8. The gas mixture in line 9 is then combined with recycle gas from line 33 and sent by line 10 through a third compressor 11. Turbine 13, operated by steam passing through lines 12 and 14, is employed to drive compressors 6, 8 and 11.

The gas mixture from compressor 11 is cooled by one or more heat exchangers, such as 16, as it passes through lines 15 and 17 to secondary separator 19. A portion of the gas mixture condenses to ammonia in separator 19 and this liquid ammonia is withdrawn through lines 23 and 24 to the ammonia plant refrigeration and product storage system (not shown).

Gases which do not condense in separator 19 are sent along line 25 to ammonia synthesis convertor 26 for conversion into ammonia. The resulting gaseous reaction mixture is then withdrawn through line 27, cooled in at least one heat exchanger 28 and finally passed through line 29 into primary separator 30. Liquid ammonia is withdrawn from the primary separator and passed along line 31 into line 24. The gaseous mixture from separator 30 may be recycled through line 33 and/or passed through line 34 as purge gas which is used as fuel in the reformer.

Figure 2:
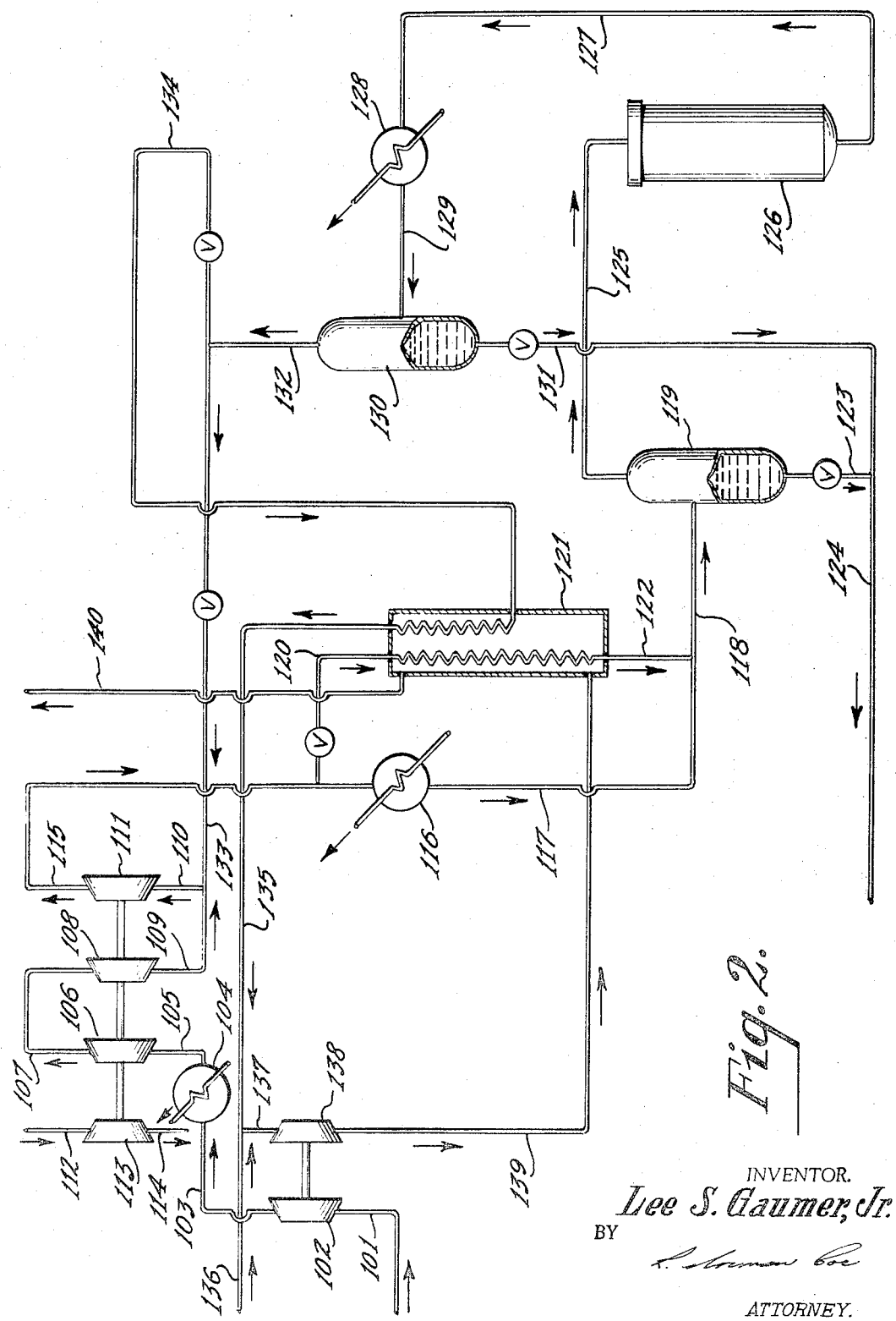

FIGURE 2 illustrates the ammonia synthesis loop shown in FIGURE 1 modified in accordance with the present invention. In the embodiment shown by FIGURE 2, fresh ammonia synthesis gas at 366 p.s.i.g. and 100° F. in line 101 is precompressed by centrifugal compressor 102. This precompression raises the pressure of the synthesis gas from 366 p.s.i.g. to approximately 450 p.s.i.g. The precompressed gas after passing through lines 103 and 105 and heat exchanger 104 which adjusts the temperature of the gas to 100° F. is then transmitted through an ammonia synthesis loop substantially identical with that illustrated in FIGURE 1.

A turbo-expander 138 is employed to expand ammonia plant natural gas fuel (550 p.s.i.g., 80° F.) from lines 136 and 137 and the synthesis loop purge gas (550 p.s.i.g., 80° F.) from lines 135 and 137 after pressure letdown (not shown) and reheat from 550 p.s.i.g. to 35 p.s.i.g. Energy generated by the turbo-expander, approximately 785 BHP, is directly utilized to drive centrifugal compressor 102.

In addition to this substantial horsepower recovery, the cold expander effluent from line 139, at approximately −128° F., and the purge gas in line 134 after pressure letdown (not shown) at approximately −100° F., are warmed in heat exchanger 121. The warmed expander effluent is passed through line 140 for utilization in the ammonia plant fuel system of the reformer (not shown). By transmitting a portion of the gas mixture in line 115 through lines 120, 122 and 118 and heat exchanger 121 approximately 3,000,000 B.t.u./hour of cooling potential over that available in the operation of the plant illustrated by FIGURE 1 is applied to cool the portion of synthesis gas transmitted through lines 120 and 122 to secondary separtor 119. This results in a saving of approximately 167 tons of ammonia refrigeration.

Thus, for a 600 T/SD ammonia plant, the application of a turbo-expander as illustrated in FIGURE 2 results in a horsepower saving of 1,385 BHP out of a total of 18,520 BHP in the system set forth in FIGURE 1. In other words, a saving of 7.5% is obtained enabling the plant to produce about 45 T/SD additional ammonia or save approximately $73/SD on fuel (based on 10,000 B.t.u./hour per BHP).

The invention has been described in connection with a particular modern ammonia synthesis plant. However, it is within the scope of the invention to employ an expansion-compressor turbine for the precompression of ammonia synthesis gas in any ammonia plant synthesis loop. Thus the number of heat exchangers as well as the presence of more than one separator in such synthesis loops is immaterial. Moreover, it should be understood that operation is contemplated wherein the synthesis loop purge gas is not recycled and only fuel gas is expanded in the turbo-expander which is utilized to effect precompression of the ammonia synthesis gas.

Likewise, the invention is not to be limited by the particular operating conditions given by way of example in connection with the system studied. The process of the invention is applicable to a broad range of pressures utilized by other ammonia synthesis systems in which inlet pressures of 20 to 400 atmospheres are employed. For other systems and other processes, operating conditions suitable thereto would be employed.

Obviously, many modifications and variations of the invention as hereinbefore set forth may be made without departing from the spirit and scope thereof and therefore only such limitations should be imposed as are indicated in the appended claims.

What is claimed is:

1. In a system for the synthesis of ammonia wherein ammonia synthesis gas comprising nitrogen and hydrogen from a reformer is reacted in the presence of a catalyst in a reaction zone under ammonia-producing conditions to form an ammonia product which is subsequently liquefied, the steps of: expanding an incoming fuel gas stream enroute to said reformer in an expansion turbine while simultaneously precompressing fresh ammonia synthesis gas supplied to the system in a compressor driven by said expansion turbine and utilizing the expanded fuel gas to cool the compressed synthesis gas.

2. In a system for the synthesis of ammonia wherein ammonia synthesis gas comprising nitrogen and hydrogen from a reformer is reacted in the presence of a catalyst in a reaction zone under ammonia producing conditions to form an ammonia product which is subsequently liquefied and wherein unreacted gases are recycled to said reaction zone, the steps of: expanding an incoming fuel gas stream enroute to said reformer in a turbo-expander while simultaneously precompressing fresh ammonia synthesis gas supplied to the system in a compressor driven by said turbo-expander; further compressing the synthesis gas; passing the compressed syntheis gas into a reaction zone; separating liquid ammonia product in a separator from the gaseous reaction product obtained from the reaction zone and recovering liquid ammonia product from the separator and passing at least a portion of said separated gaseous reaction product through said turbo-expander with said incoming fuel gas stream.

3. The method as claimed in claim 2 wherein the portion of said separated gaseous reaction product which is expanded in said turbo-expander is first passed in heat exchange relationship with the compressed synthesis gas to cool said synthesis gas prior to introduction of said gas portion into said turbo-expander.

4. The method as claimed in claim 2 wherein the effluent from said turbo-expander is passed in heat exchange relationship with said compressed synthesis gas to cool said synthesis gas prior to entry into said reaction zone.

5. The method as claimed in claim 2 wherein the portion of said separated gaseous reaction product which is expanded in said turbo-expander is first passed in heat exchange relationship with the compressed synthesis gas to cool said synthesis gas prior to introduction of said gas portion into said turbo-expander.

References Cited

UNITED STATES PATENTS

| | | | |
|---|---|---|---|
| 3,054,660 | 9/1962 | Crooks et al. | 23—199 |
| 3,232,707 | 2/1966 | Nebgen | 23—199 |

OSCAR R. VERTIZ, *Primary Examiner.*

H. S. MILLER, *Assistant Examiner.*

UNITED STATES PATENT OFFICE
CERTIFICATE OF CORRECTION

Patent No. 3,368,869                          February 13, 1968

Lee S. Gaumer, Jr.

It is hereby certified that error appears in the above numbered patent requiring correction and that the said Letters Patent should read as corrected below.

Column 2, line 43, for "separtor" read -- separator --; column 4, line 16, for the claim reference numeral "2" read -- 4 --.

Signed and sealed this 22nd day of April 1969.

(SEAL)
Attest:

Edward M. Fletcher, Jr.                      EDWARD J. BRENNER
Attesting Officer                              Commissioner of Patents